July 3, 1934.  S. H. MARTIN  1,964,922
COMPOUND WOUND INTERPOLE ROTARY CONVERTER
Filed Sept. 19, 1932  3 Sheets-Sheet 1

Witnesses
Arthur M. Franke.
Fred M. Davis

Inventor
Samuel H. Martin.
Rummler, Rummler & Woodworth
Attys:

July 3, 1934.  S. H. MARTIN  1,964,922

COMPOUND WOUND INTERPOLE ROTARY CONVERTER

Filed Sept. 19, 1932   3 Sheets-Sheet 2

Inventor
Samuel H. Martin.

Witnesses
Arthur M. Framke.
Fred N. Davis

By Rummler, Rummler & Woodworth
Attys:

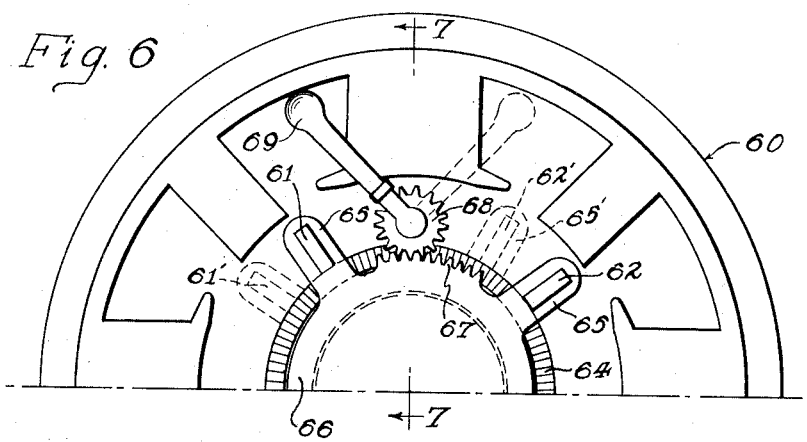
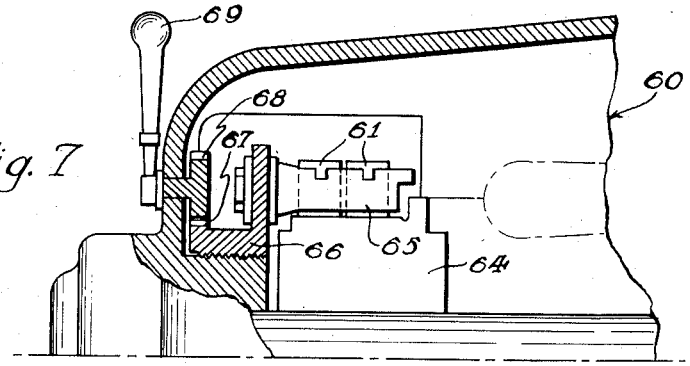
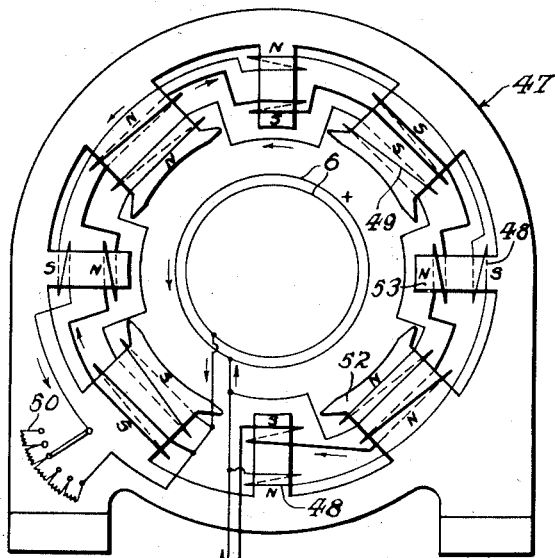

Patented July 3, 1934

1,964,922

UNITED STATES PATENT OFFICE 1,964,922

COMPOUND WOUND INTERPOLE ROTARY CONVERTER

Samuel H. Martin, Chicago, Ill.

Application September 19, 1932, Serial No. 633,819

1 Claim. (Cl. 171—123)

This invention relates to electrical machinery and more especially to improvements in compound wound rotary converters of the interpole variety, both for alternating current to direct current and for direct current to alternating current service.

The main objects of my invention are to provide improved and simplified means for controlling the operating characteristics of such machines; to provide especially for self-regulation of the voltage of the secondary or derived current as the load varies; to provide for automatic variation and control as to size or spread of the polar arc, in accordance with the load; to provide for pre-determining these characteristics, either for a rising or drooping voltage curve as the load increases and in accordance with a predetermined ratio; to provide for this through shifting of the brushes within appropriate limits according to a desired characteristic; to provide for assuring, in such a machine, good commutation and freedom from sparking, at all proper loads, and within a proper arcuate range of brush adjustment; to provide for these ends through the use of interpoles and differential interpolar windings; and to provide such a structure adapted for efficient and economic use of materials and labor both in manufacture and in operation.

There should be noted here the well-known fact that the ratio between the alternating current and direct current voltages on ordinary converters of the rotary type is not fixed but variable, and depends on the effective arc of the magnetic flux at the several polar elements, which in turn may be affected by the load.

In such machines, wide arc pole pieces enclosing most of the armature periphery give the highest (wide difference) voltage ratio and very short arc pole pieces give the lowest ratio (small difference), the ratio varying substantially in proportion to the extent of the polar arc, and varying from about .7 to near unity. It is possible to utilize this voltage ratio characteristic in the design of alternating current to direct current converters and use the direct current load current to spread the polar arc with the result that the direct current voltage can be made to hold constant or, if desired, to rise with the load as on a compound-wound direct current generator, the primary voltage remaining substantially constant.

This principle applies reversely to the design of direct current to alternating current "inverted" converters in which case the power-supply direct current taken by the converter is used to contract or shorten the polar arc, whereby it is possible to hold the alternating current voltage constant or give it a rising characteristic with increase of load, which will depend somewhat on the power factor of the load itself.

In order to accomplish these results satisfactorily and to produce an efficient machine, I have devoted a great deal of time and attention to the subject, and while I have been building alternating current to direct current converters for many years, on which the polar arc was spread by means of a series winding wound into the old style damper gram-ring fashion, subject to certain limitations, it is only recently that I have discovered the better way, herein described and claimed, which can be used to get these and greatly improved results on various designs of alternating current to direct current converters and also on direct current to alternating current (inverted) converters.

The control of the output voltage characteristic for varying loads, and also perfect commutation at all loads in both types of my converter, as hereinafter more fully described, is accomplished fundamentally by the use of interpole field elements compound-wound and differentially connected and this is further controlled by shifting the direct current brushes forwardly or backwardly in accordance with a desired inclination for the secondary voltage characteristic.

This invention is illustrated by the accompanying drawings in which:

Figure 1 is a conventional diagram of a compound-wound direct current to alternating current interpole rotary converter, commonly known as an inverted converter, the field member being stationary and the armature being rotary.

Fig. 2 in a similar manner shows a modified and somewhat more complex form of such a machine adapted to serve for alternating current to direct current use.

Figure 6 shows the upper half of a conventional endwise representation of a single armature rotary converter having positive means for operating the rock arm to shift the brushes, part of the shell or housing being removed, as will be apparent.

Figure 7 is mainly a sectional view taken substantially on the line 7—7 of Figure 6, the shell being in place.

Figure 8 is mainly similar to Figure 1 except that the shunt windings for the main poles and interpoles are arranged in two separate series and a rheostat is connected in series with those shunt windings which are used on the interpoles.

Figure 1:
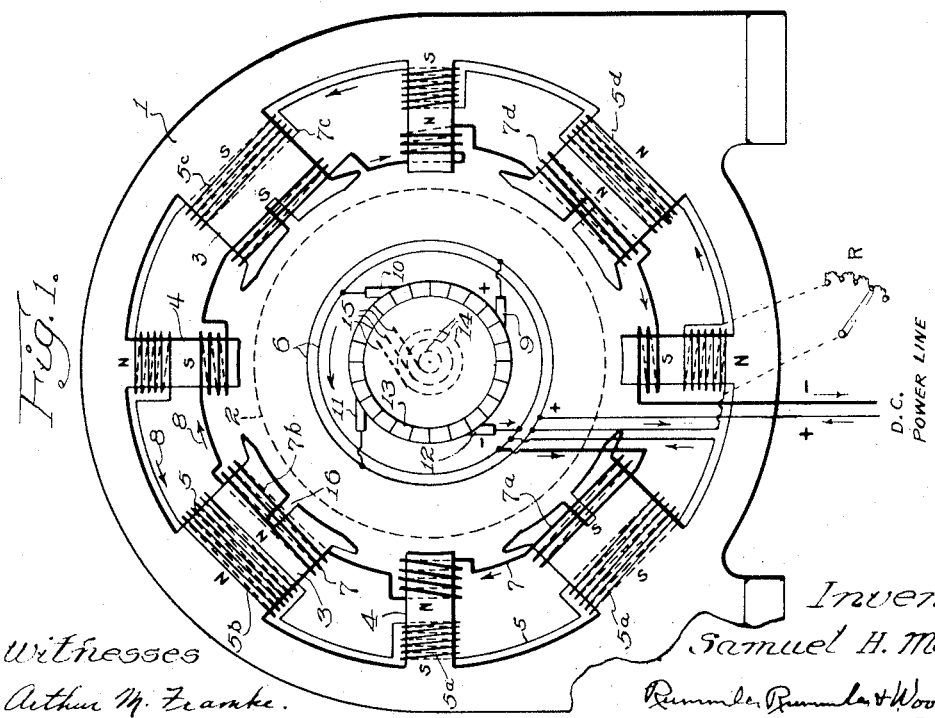

Referring first to Fig. 1, the direct current to alternating current "inverted" converter here shown comprises a field member 1 and an armature 2, the peripheral edge of the latter being shown in dotted outline. Here the member 1 is formed and adapted to serve as the stator while armature 2 serves as the rotor, as usual in such machines.

Said field member 1 is annular in general shape and has four uniformly spaced, inwardly disposed main polar elements 3 and intermediate thereof minor polar elements 4, in combination with a shunt winding 5, means 6 (rings) to supply direct current thereto and a series winding 7 connected to the direct current source, said shunt windings 5 being arranged (1st) to energize alternate main poles 3 for opposite polarity, as indicated both by the direction of winding of the several shunt coils 5a, 5b, 5c and 5d, and by the letters N and S; and (2nd) to energize the interpoles 4 for like polarity with the next adjacent main poles respectively lying in the direction of relative rotation of the armature—that is to say, lying in the counter-clockwise direction on Fig. 1, and said series winding 7 being arranged on said main and interpole members to augment and oppose respectively the effect of the shunt winding thereon, as indicated both by the corresponding letters N and S and by the direction of winding of the several series coils 7a, 7b, 7c and 7d, the direction of current flow being indicated by arrows 8.

The direct current distributing buses or rings 6 are fixed to the field member, and the brushes 9, 10, 11 and 12 connected thereto bear on the commutator 13, the polarities being indicated by plus and minus signs. The A. C. collector rings 14 and brushes 15 therefor on the opposite end of the rotor are indicated by dotted lines, as will be understood.

On full load the interpole series and shunt windings are effective in about the ratio of one to five. In order to help stabilize the location of the field flux the main poles are split somewhat, as at 16.

Figure 2:
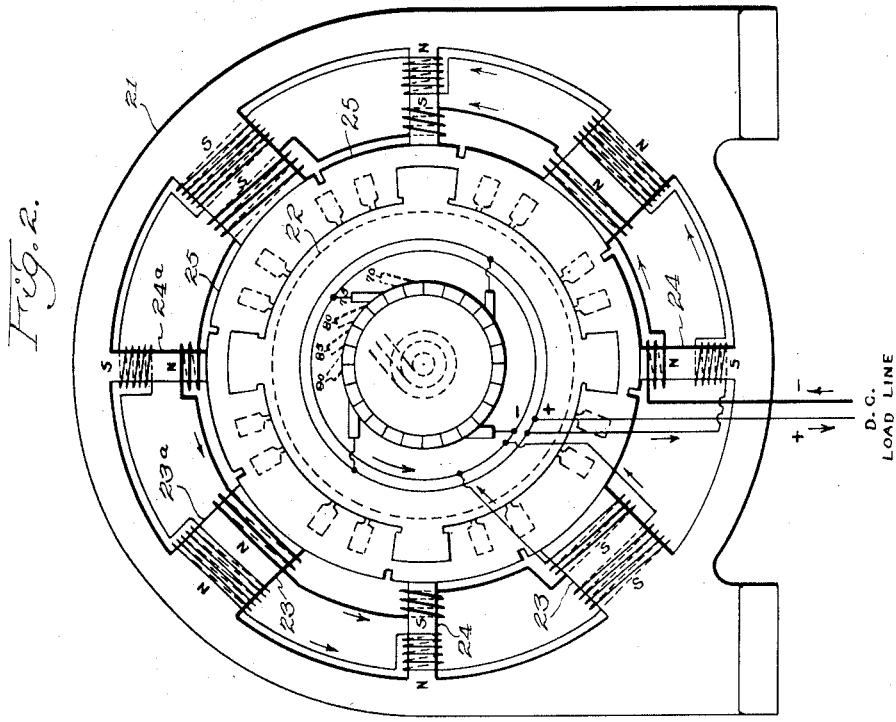

Referring now to Fig. 2, the A. C. to D. C. generator here shown comprises a somewhat modified form of field member 21, and substantially the same form of armature 22, designed as in Fig. 1 to serve as a stator and rotor respectively. Said field member 21 is substantially similar in general design to the field member 1 of Fig. 1, except that in order to render the converter self-starting under A. C. power, there is embraced by the main outer ring in snug contact with the inner faces of the main pole and interpole members 23 and 24 respectively, a slotted interior field ring 25, the connection of the shunt windings on the interpoles being reversed, and the direction of flow in the interpole series windings also being reversed; so that on no load the interpoles have like polarity with the next adjacent main poles in the direction opposite to that of relative rotation—that is to say, in the clockwise direction on Fig. 2, and the series windings tend to neutralize the interpoles. The ring 25 has starting coils, not shown, but this feature is old and well understood without need for further comment.

Here the interpole 24a is regarded as taken with the main pole 23a and the corresponding part of ring 25 constitutes the joint effective polar face adjacent to the armature. Hence, with a setting of the D. C. brushes electrically opposite the interpoles, the polar arc is broadened in effect by rocking the brush to the left (C. C.) and vice versa, and as the polar arc is thus broadened, the D. C. output voltage rises, the input A. C. voltage remaining constant. On no load the member 24a opposes 23a, but a load tends to neutralize or weaken the pole 24a, so that as a load comes on the voltage characteristic droops when the brush is set to the left and rises when it is set to the right. See Figs. 3 and 4.

Hence, owing to this construction, the load voltage characteristic of the machine may be altered by appropriate setting of the brushes, as for instance a substantially flat voltage curve, or more frequently a slightly rising voltage curve, as will be understood. (See Fig. 5.)

Figure 3:
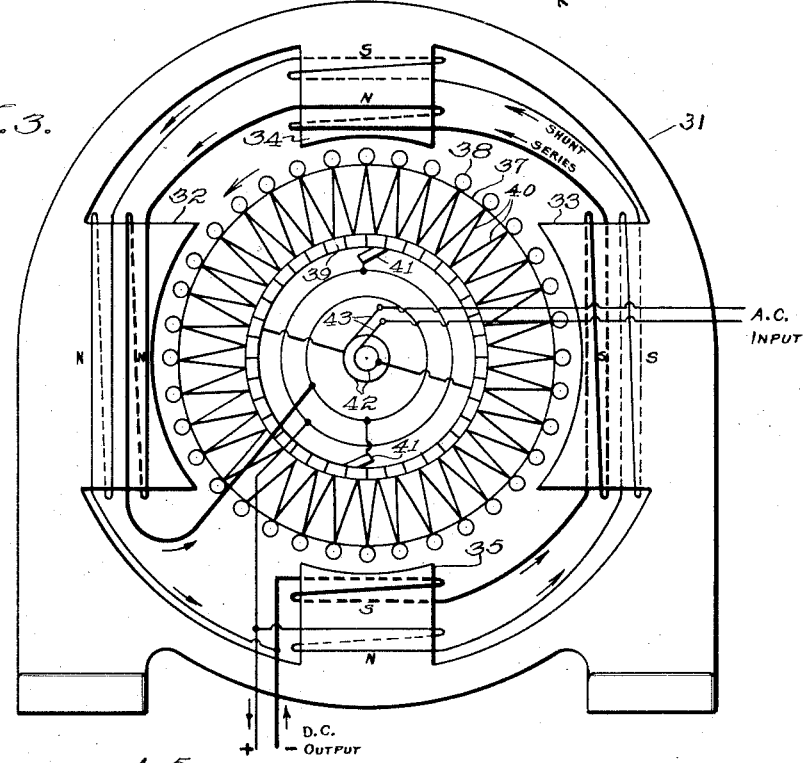
Fig. 3 is a highly conventional and somewhat simplified diagram of a two-pole converter with the essential elements in substantially their true relation respecting electrical angular position, and with the slot wound starting ring omitted between the main field member and the armature, as will be understood.

In the single-phase two-pole diagram of Fig. 3, the converter is represented in simplified conventional form, with the slotted starting ring omitted from the field member for simplicity, and with the electrical and magnetic members shown in substantially their true relation respecting electrical angular position.

Here the field member 31 has a north pole member 32, a south pole member 33 and interpoles 34 and 35 wound as shown; and the drum armature 37 has a winding 38, a commutator 39, with leads 40 connected to winding 38, D. C. brushes 41, A. C. rings 42 and brushes 43 therefor.

The principles governing the positioning of the D. C. brushes 41 relative to the field members and magnetic flux is apparent from this view (Fig. 3) taken in connection with Figs. 4 and 5.

Figure 4:
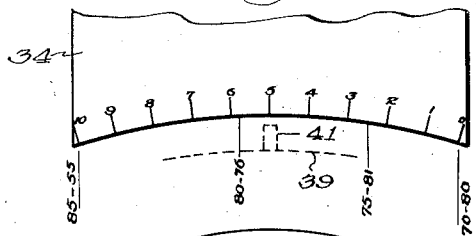
Fig. 4 is an elementary diagram illustrating the control of output voltage by direct current brush shifting relative to an interpole.
Figure 5:
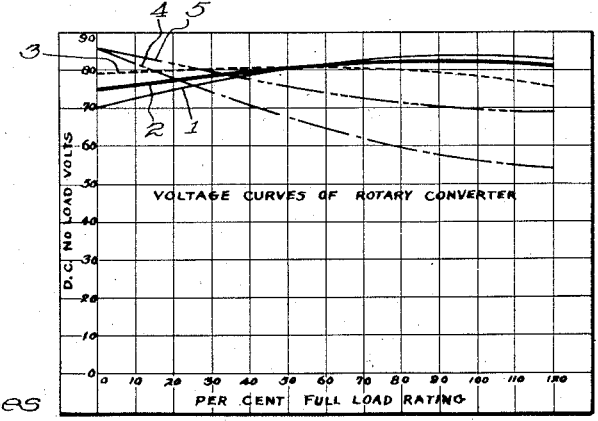
Fig. 5 shows a set of characteristic D. C. load voltage curves for various brush settings relative to the interpoles of a converter.

The relation of Fig. 5 to Fig. 4 may be explained by saying that the curves numbered 1, 2, 3, 4 and 5, on Fig. 5, correspond about with D. C. brush settings electrically opposite the interpole gage marks 0, 2.5, 5.75 and 10 respectively on Fig. 4, the D. C. brush 41 being here shown opposite gage mark 5.

In considering the curves of Fig. 5, it is only necessary to keep in mind that adjusting the D. C. brush rockably over a range from one extreme tip of the interpole to the extreme tip on the other side gives the wide variation in no load voltage shown by said curves.

Curve 1 for instance shows that with the D. C. brush, set opposite the right-hand edge of interpole 34 of Fig. 4, gives a no-load voltage of about 70, the voltage curve rising gradually with the load up to about 90% full load, whereupon it begins to droop. When the brush is set opposite the other edge of the interpole, the no-load voltage is about 85, and droops consistently for all normal load increase.

From these curves it is apparent that when the brushes are rocked backwards from the direction of rotation to the outside line of the interpole, there is obtained the lowest initial voltage without load, and the highest voltage with load on. On the other hand, when the brushes are rocked ahead to the other edges of the interpole, there is obtained the highest initial voltage and the greatest voltage droop with the load on. For a standard converter the brush position for curve 2 on Fig. 5, and corresponding with gage 2.5 on Fig. 4, represents the best position for good general results, as for arc lighting. But when the converter is to be used for arc welding and excessive droop is required, it is necessary to rock the brushes in the direction of rotation, as for curve 5.

The peculiar and especially desirable thing about this interpole, wound as herein described for converters, is that the action is just the same on the inverted converter as on the standard converter, with the exception that on the inverted converter, it is the A. C. voltage that rises or droops, as the case may be, for different positions of the brushes, all comparable with and similar to the D. C. voltage characteristics for the standard converter.

It is to be noted that on no load the main poles are excited about five times as strong as the interpoles, and that the regular shunt excitation of the interpoles is about four-fifths as great as the full load series excitation, so that as the load increased from zero the interpole magnetism is eventually reversed as full load is approached; and on full load the series excitation is twenty-five per cent greater than the shunt excitation on the interpoles.

It is to be noted also that the interpoles tend, on no load, to broaden the field as a whole and swing it somewhat counter-clockwise, as viewed in Figs. 2 and 3; whereas a load tends to weaken the field as a whole, especially at the interpole, and to narrow it and also to rock it clockwise, as viewed in Figs. 2 and 3.

Furthermore, referring to Figs. 3 and 4, when the D. C. brushes are set to the right, or at zero on Fig. 4, the effective field is narrow and the effective flux is least, so that the D. C. voltage is low and about or more nearly like that of the A. C. input, namely about or some above 60 v. Then as the load increased the interpole becomes more or less neutralized and the effective field broadens, so that the conversion ratio verges toward seven-tenths, thus causing the D. C. voltage to rise above the fixed A. C. power voltage.

On the other hand, setting the brushes at the other edge of the interpole (left on Figs. 2, 3 and 4) makes for more effective flux and a broader field, with a no-load ratio of somewhat above seven-tenths, so that the D. C. load voltage is well above the A. C. power voltage. Then as the load increases the field is narrowed by series neutralization of the interpole, the voltage ratio approaches unity, and the D. C. voltage droops as per curve No. 5. This is accentuated as the interpole is reversed in polarity at or near full load.

Intermediate settings for the D. C. brushes produce corresponding curves ranging in character between the extremes of No. 1 and No. 4, and including a substantially flat voltage curve if desired, depending upon design and adjustment, as will be understood.

I have found that for some purposes an inverted converter may be effectually regulated as to output voltage, that is to say on the A. C. side through a range of about eight percent by means of a rheostat connected across inter-pole shunt windings.

When such a rheostat is to be used the interpole shunt windings may best be connected immediately in series with one another, instead of alternately with the main pole shunt windings, as will be understood, so that one rheostat may be bridged across the interpole shunt windings taken as a whole. By this means the effect of the interpole shunt windings may be more or less neutralized on no load or on various loads, and as thus used augment the magnetic effect of the series interpole windings.

Referring to Fig. 8, the inverted single armature converter 47 is similar to that of Fig. 1 except that the interpole shunt windings 48 are all connected in a series separate from the main pole shunt windings 49 and are also in series with a common rheostat 50.

The series load current from the D. C. generator 51 energizes both the main poles 52 and interpoles 53, each main pole and the next interpole in the direction of rotation being similarly energized by the series windings. The main poles are all cooperatively wound, and the interpoles differentially.

It is to be further understood that dynamo electric machines and especially direct current generators may be constructed with the main and interpoles wound substantially as herein set forth and as shown by the drawings whereby the voltage characteristics of such generators may be automatically controlled. In such machines the polar elements and the windings thereon so affect field placement and distortion that voltage characteristics may be predetermined by setting of the brushes relative to the interpoles, substantially as in the converters above described.

It will be understood, for instance, that the machine of Fig. 3 if driven by a belt instead of by alternating current, would constitute an interpole D. C. generator, in which case the interpoles tend at no load to distort the field in the direction of rotation, whereas a load tends to neutralize the interpoles and so tends to restore the field in the opposite direction.

The series windings on the interpoles also tend to overcome the field distortional effect of cross magnetization of the D. C. generator.

As a net result of these field conditions the setting of the brushes to the right as on Fig. 4 results in relatively low initial voltage, with increase as the load comes on. This is owing to a substantial field movement from left to right relative to Fig. 4, whereby it assumes a more efficient position relative to the brushes as the load increases.

When the brushes are set to the left, reference being had to Fig. 4, the position is favorable to high voltage on no load, but as load comes on the field is swung materially to the right, whereby the brushes assume in effect a less efficient position relative to the field and the voltage droops accordingly.

The machine 60 shown by Figs. 6 and 7 structurally is substantially like that of Figs. 1 and 2, and these views are intended mainly to show the rocker arm idea. Here the brushes 61, 62, etc. for the commutator 64 are mounted on the rocker arms 65 which in turn are carried by the oscillatorily mounted rocker ring 66 having a gear rack part 67 which rack is controlled by a gear wheel 68, the latter having a manual control handle 69. This geared controller is suitable for large machines, but rocker rings are turnable directly by hand are sufficient for the smaller machines, as will be understood without further illustration.

It is to be understood that some of the details set forth may be altered or omitted without departing from the spirit of the invention as defined by the following claim.

I claim:

A rotary converter of the class described comprising an interpole style of field member and an armature, and having shunt and series field windings arranged to oscillate the field adjustably one way or the other according to load, and D. C. brushes adjustable rockably on the armature coaxially therewith to vary the secondary voltage characteristic according to specific need.

SAMUEL H. MARTIN.